M. T. FOSTER.
FISH HOOK.
APPLICATION FILED APR. 5, 1917.
1,288,552.
Patented Dec. 24, 1918.
2 SHEETS—SHEET 1.
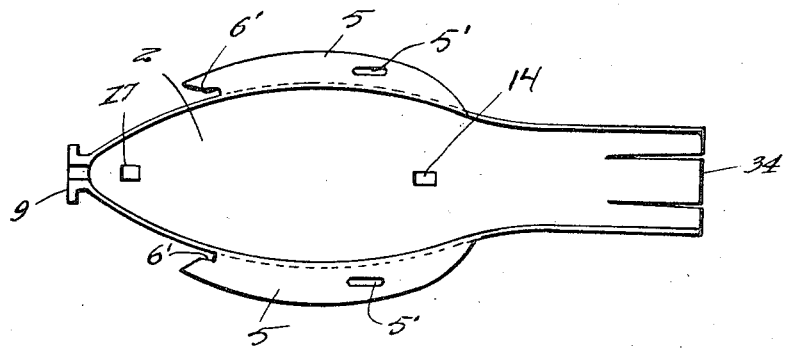
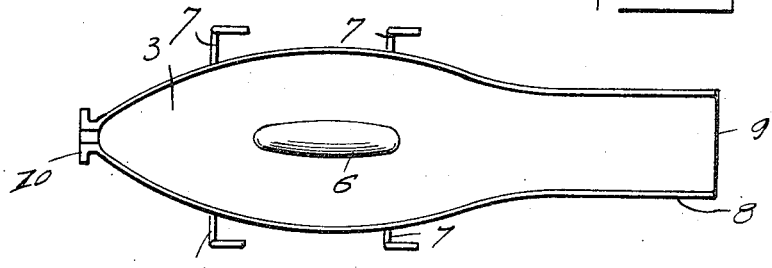
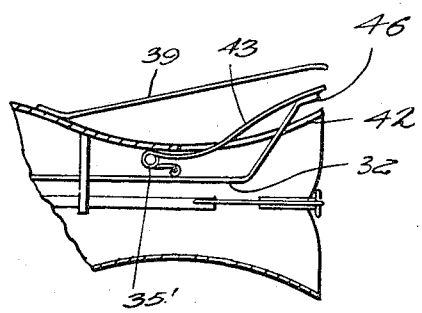
Inventor
M. T. Foster
Witnesses M. T. FOSTER.
FISH HOOK.
APPLICATION FILED APR. 5, 1917.
1,288,552.
Patented Dec. 24, 1918.
2 SHEETS—SHEET 2.
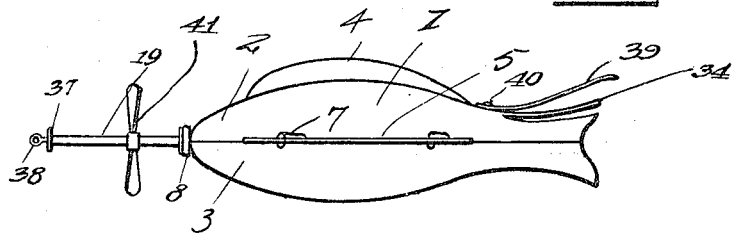
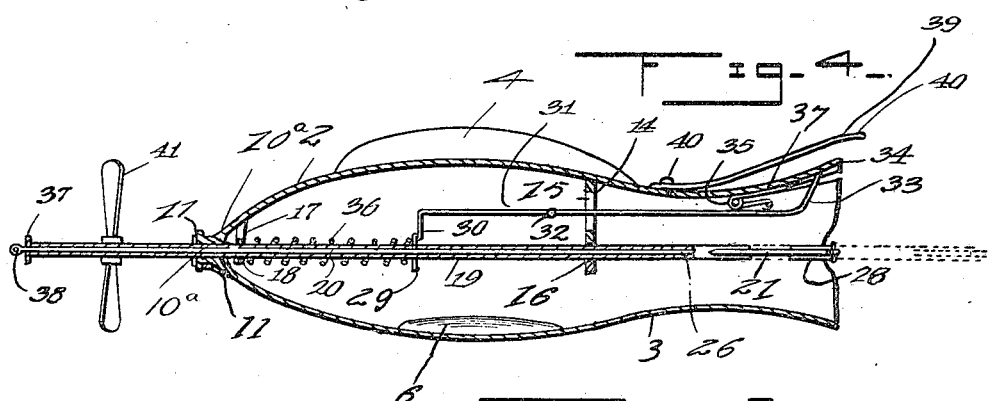
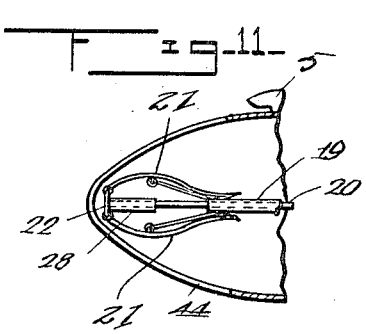
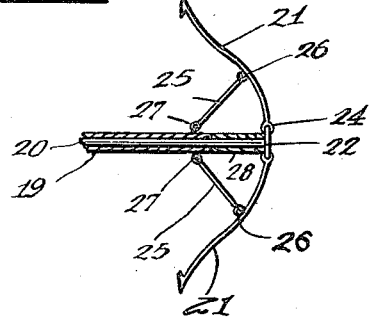
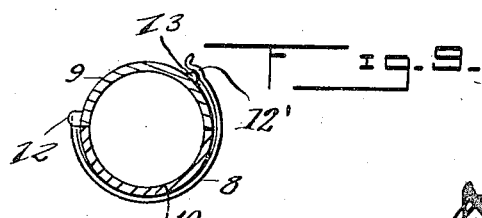
Inventor
M. T. Foster

UNITED STATES PATENT OFFICE.

MILES T. FOSTER, OF GRAND RAPIDS, WISCONSIN.

FISH-HOOK.

1,288,552. Specification of Letters Patent. Patented Dec. 24, 1918.

Application filed April 5, 1917. Serial No. 159,920.

*To all whom it may concern:*

Be it known that I, MILES T. FOSTER, a citizen of the United States, residing at Grand Rapids, in the county of Wood and State of Wisconsin, have invented certain new and useful Improvements in Fish-Hooks; and I do hereby declare the following to be a full, clear, and exact description of the invention, such as will enable others skilled in the art to which it appertains to make and use the same.

This invention relates to improvements in fish hooks.

The object of this invention is the provision of a device in which the hooks or barbs will be positively released and expanded within the mouth or jaws of the fish, and in which releasing devices are employed which will not be actuated by contact with weeds or other obstructions, the hook concealing body being formed to resemble a minnow or squid as nearly as possible, and a plurality of hooks concealed within the body and so constructed that they will be instantly released when the body has been actually grabbed by a fish in an attempt to swallow it.

Another object of this invention is the provision of a plurality of hooks which are adapted to be concealed within a body of an artificial minnow or squid, which serves as a bait and resembles a minnow or squid as nearly as possible, thus when the fish actually grabs the body in an attempt to swallow it, it will automatically release the releasing rod, which will permit the hooks and bars to expand in the mouth or jaws of the fish and thus the fish is effectively secured to the hooks until released by the resetting of the device.

A further object of this invention is the provision of a device of this character, which will be simple, durable and efficient, and which may be manufactured and sold at a comparatively small cost.

With these and other objects in view, the invention consists in the novel combination and arrangement of parts hereinafter more fully described and set forth in the claims hereto appended.

In the drawings:

Figure 1 is a plan view of the top section as made in accordance with this invention, Fig. 2 is a plan view of the bottom section as made in accordance with this invention, Fig. 3 is a side elevation of the improved fish bait illustrating the sections detachably connected together, Fig. 4 is a longitudinal sectional view of the same, Fig. 5 is a fragmentary vertical section illustrating the springs for actuating the releasing rod, Fig. 6 is a detail view of the connecting ring, Fig. 7 is a perspective view of the expanding rod, Fig. 8 is a fragmentary sectional view of the hooks or barbs in expanded position, Fig. 9 is a sectional view illustrating the manner in which the front ends of the sections are held detachably connected together, Fig. 10 is a sectional view, showing the connection of the expanding rods to the tube, Fig. 11 is a fragmentary sectional view illustrating a slightly modified form of the invention to show the device applied in the mouth of the artificial bait.

Referring to the drawings by reference numerals, 1 indicates the body of my improved fish hook. The body is formed in simulation of a minnow or squid, and it comprises an upper section 2 and a lower section 3, the sections being detachably connected together. The top section 2 is provided with a top flange 4 and with side flanges 5, the flanges simulating the top and side fins of a minnow or squid. The side flanges 5, which are located adjacent the lower side edges of the top section 2, are provided adjacent their rear ends with longitudinally extending closed slots 5' and adjacent their front ends with slots 6' which latter slots open out through the front ends of the side flanges. The lower section 3 is provided with an interiorly arranged weight 6 which, in conjunction with the flanges 4 and 5, holds the device in a horizontal position when in the water. The section 3 is also provided on each side thereof with a pair of relatively spaced hooks 7. The hooks 7 extend through the openings 5' and 6' and engage the upper faces of the side flanges 5 to detachably secure the sections 2 and 3 in assembly against any relative transverse movement. To prevent the sections 2 and 3 from having any relative longitudinal movements, so as to prevent the hooks from being moved out of engagement with the upper surfaces of the side flanges 5, an arcuate locking element 8 is employed. The locking element 8 is adapted to embrace semicylindrical extensions 9 and 10 formed, respectively, upon the front ends of the sections 2 and 3 and engage the front ends of said sections and semi-circular upstanding flanges 11 formed upon the front ends of the extensions 9 and 10. The locking element 8 is pivoted at one end to the extension 9, as at 12, and it is provided adjacent its free end with a depression 12' adapted to receive a lug 13 formed upon the extension 9, the lug 13 holding the locking element 8 in embracing or locking position.

It should be apparent that the hooks 7, flanges 5 and locking element 8 hold the body sections 2 and 3 in assembly against any accidental movements. When it is desired to separate the sections so as to gain access to the mechanism carried by the body 1, it is only necessary to swing the locking element 8 out of embracing engagement with the extensions 9 and 10, then move the sections 2 and 3 longitudinally with relation to each other in opposite directions so as to position the horizontal portions of the hooks 7 in alinement with the slots 5' and 6', and thence move the sections away from each other.

A depending bracket 14 is secured within the section 2 adjacent the rear end thereof. This bracket is provided with an elongated slot 15, and at a point below the slot with a bearing opening 16. A second depending bracket 17 is secured within the section 2 adjacent the front end thereof, and it is provided with a bearing opening 18 which is in alinement with the bearing opening 16. A tubular rod 19, which is of greater length than the body 1, and which extends longitudinally of the body 1, is slidably mounted in the bearing openings 16 and 18 and in the bearing formed by the semicylindrical extensions 9 and 10. A rod 20, which is of greater length than the tube 19, is slidably mounted within said tube. A plurality of hooks 21 are pivotally connected to a disk 22 which is secured to the rear end of the rod 20. The connection between the hooks 21 and the disks 22 is a detachable one so that the hooks may be replaced when they become broken or otherwise rendered unfit for use, and the disk is provided with a plurality of openings 23 to permit the hooks to be connected to the disk through the medium of the loops 24. A plurality of links 25 are detachably connected to loops 26 carried by the hooks 21 and to loops 27 carried by the rear end of the tube 19. By reference to Fig. 7 of the drawings, it will be seen that each link 25 is provided at each end with a coiled loop 28, the coiled loops being of such construction as to permit them to be readily and quickly attached to and detached from the loops 26 and 27.

The connection between the hooks 21 and the rod 20, and the connection between the hooks and the tube 19, are such that relative movements of the rod and tube in reverse directions will cause the hooks to spread outwardly or close the hooks upon the rod and tube. To limit the spreading of the hooks 22, a spacer 28 is secured to the rear end of the rod 20 between the disk 22 and the rear end of the tube 19.

When it is desired to close or collapse the hooks 21 upon the tube 19 and rod 20, the tube and rod are moved relatively in a forward and rearward direction, respectively. After this has been accomplished, the tube 19 and rod 20 are moved simultaneously in a forward direction with relation to the body 1, such movement of the tube and rod positioning the closed hooks within the rear end of the body. When the closed hooks 21 are positioned within the rear end of the body 1, a shoulder 29, which is carried by the tube 19, is engaged by the hook 30 of a trigger 31. This trigger is pivotally mounted within the body 1 as at 32. The pivot 32 is located in advance of the bracket 14, and the trigger 31 extends rearwardly through the slot 15 in the bracket and has its rear upturned end 33 secured to the under side of a flexible portion 34 of the rear end of the body. The flexible portion 34 is yieldingly supported in raised position, and the trigger 31 is yieldingly retained in active position, by a coiled spring 35 which is secured at one end to the under side of the flexible portion 34 and at its other end to the body 1. A coiled spring 36, which surrounds the tube 19 and which is located between the bracket 17 and the shoulder 29, is adapted, when the trigger 31 is moved into inactive or releasing position by pressure applied to the flexible portion 34 by a fish, to move the tube 19 and rod 20 rearwardly with relation to the body 1, resulting in the hooks 21 being positioned rearwardly beyond the rear end of the body in opened or spread relation. To limit the movement of the rod 20 and tube 19 by the spring 36, the front end of the tube is provided with a shoulder 37, and to limit the rearward movement of the rod 20 with relation to the tube 19 and to permit the device to be connected to a fish line, the front end of the rod 20 is provided with a loop 38.

A guard 39, which is secured as at 40 to the body 1, overlies the flexible portion 34 and prevents such portion from being depressed and the consequent movement of the trigger 31 into inactive or releasing position by obstacles in the water. A spinner 41 is rotatably mounted upon the front end of the tube 19.

In Fig. 5 of the drawings, there is illustrated a slightly modified form of the device. In this form of the device, the body is not provided with a flexible portion to permit the trigger 31 to be moved into inactive or releasing position by a fish, but instead the spring 35 has one of its ends extended upwardly and rearwardly through a slot 42 in the upper side of the rear end of the body 1 to provide a depressible member 43 to the under side of which the rear end of the trigger 31 is secured.

In Fig. 11 a further modification of the device is shown. In this form of the invention the hooks 21 are located at the nose end of the body 1, and to permit the hooks to be projected beyond this end of the body and opened, the body is provided with a slot 44.

While I have shown and described the preferred embodiment of my invention, it will be understood that minor changes in the construction, combination and arrangement of parts may be made without departing from the spirit and scope of the invention as defined by the claims.

What is claimed is:

1. A fish hook comprising a hollow body, a tube slidably mounted in the body, a rod of greater length than the tube arranged in the tube for movement therewith and for movement independently thereof, hooks pivotally connected to one end of the rod, links pivoted to the hooks and to the adjacent end of the tube, releasable means for holding the tube and rod in such position with relation to each other and to the body as to maintain the hooks in closed position within the body, and a spring adapted to move the tube and rod with relation to the body and with relation to each other to project the hooks beyond the body in opened or spread relation.

2. A fish hook comprising a hollow body having one end thereof open, a tube mounted within the body for slidable movement longitudinally thereof, a rod mounted within the tube for movement therewith and for longitudinal movement with relation thereto, hooks pivoted to that end of said rod which is located at the open end of the body, links pivoted to said hooks and to the adjacent end of the tube, a shoulder carried by the tube, a trigger pivoted within the body and adapted to engage said shoulder, and a spring engaging said shoulder, the other end of the rod being adapted to be connected to a fish line.

3. A fish hook comprising a hollow body having one end thereof open, a tube mounted within the body for slidable movement longitudinally thereof, a rod mounted within the tube for movement therewith and for longitudinal movement with relation thereto, hooks pivoted to that end of said rod which is located at the open end of the body, links pivoted to said hooks and to the adjacent end of the tube, a shoulder carried by the tube, a depressible member carried by the body, a trigger pivoted within the body and connected to said depressible member and adapted to engage said shoulder, and a spring engaging said shoulder, the other end of said rod being adapted to be connected to a fish line.

In testimony whereof I affix my signature in presence of two witnesses.

MILES T. FOSTER.

Witnesses:
JNO. J. JEFFREY,
W. E. FISHER.

Copies of this patent may be obtained for five cents each, by addressing the "Commissioner of Patents, Washington, D. C."